United States Patent [19]
Martin

[11] Patent Number: 5,806,662
[45] Date of Patent: Sep. 15, 1998

[54] HUBBED BELT AND DRIVE FOR CONVERSION PRESS

[75] Inventor: Gregory S. Martin, Springfield, Ohio

[73] Assignee: Dayton Reliable Tool & Mfg. Co., Dayton, Ohio

[21] Appl. No.: 696,169

[22] Filed: Aug. 13, 1996

[51] Int. Cl.[6] .................................................. B65G 17/34
[52] U.S. Cl. .................... 198/803.15; 198/834; 474/153; 72/426
[58] Field of Search .................. 198/803.14, 803.15, 198/834; 72/419, 426; 413/45, 47, 52, 66; 474/153, 204

[56] References Cited

U.S. PATENT DOCUMENTS

| Re. 33,061 | 9/1989 | Brown . | |
|---|---|---|---|
| 3,156,126 | 11/1964 | Olsen | 474/153 |
| 3,231,065 | 1/1966 | Kaminski et al. . | |
| 3,515,443 | 6/1970 | Hallaman | 198/834 |
| 3,642,120 | 2/1972 | Duhan . | |
| 3,812,953 | 5/1974 | Maschke . | |
| 3,851,536 | 12/1974 | Zeldman | 474/153 |
| 4,568,320 | 2/1986 | Tangorra | 198/834 |
| 4,605,389 | 8/1986 | Westhoff . | |
| 5,025,916 | 6/1991 | Kaminski . | |
| 5,119,924 | 6/1992 | Kaminski . | |
| 5,158,410 | 10/1992 | Hunt . | |
| 5,259,496 | 11/1993 | Common . | |

FOREIGN PATENT DOCUMENTS 409626  2/1945  Italy .

Primary Examiner—Joseph E. Valenza
Attorney, Agent, or Firm—Wood, Herron & Evans, L.L.P.

[57] ABSTRACT

An endless metal belt (26) for transporting shells (S) through a press (10) which converts the shells into can ends includes a plurality of shell-carrying apertures (32) and a plurality of drive holes (34). The belt is mounted about a pair of spaced-apart cylindrical drums (22,24), at least one of which is rotatably driven. The drive holes are engaged by drive pins (46) extending outwardly from the drive drum (22). Rotation of the drive drum causes the pins to engage the drive holes and advance the belt with the drum. Each drive hole has a hub (58) which is shaped to conform generally to a tapered and contoured edge (48) of a drive pin. At least a portion of the hub protrudes out of the planar surface (56) of the belt, and the pin edge and the lower surface (62) of the hub are mutually shaped to define rolling contact therebetween with no contact between the pin edge and the inner edge (54) of the drive hole.

17 Claims, 5 Drawing Sheets

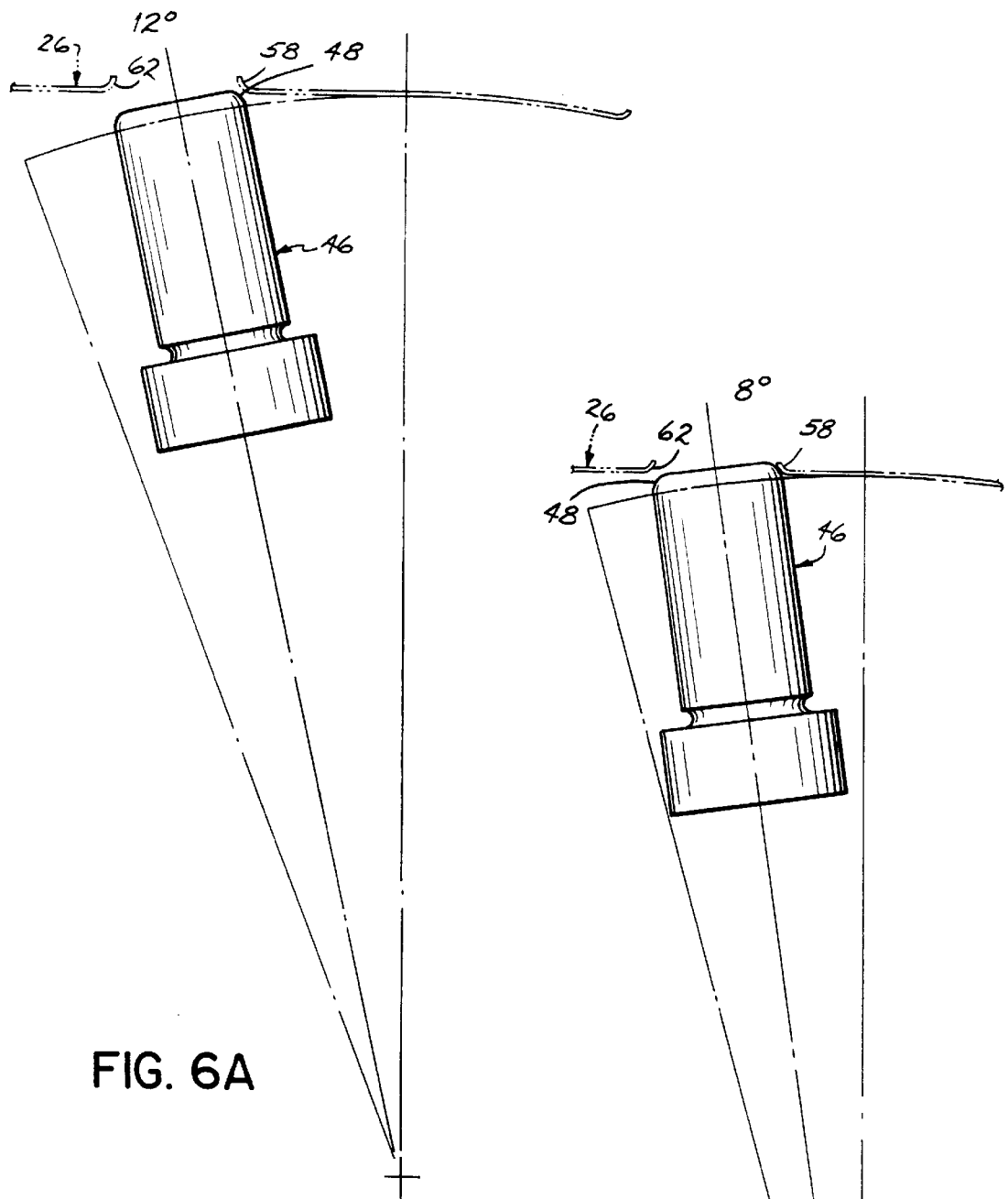
FIG. 6A
FIG. 6B
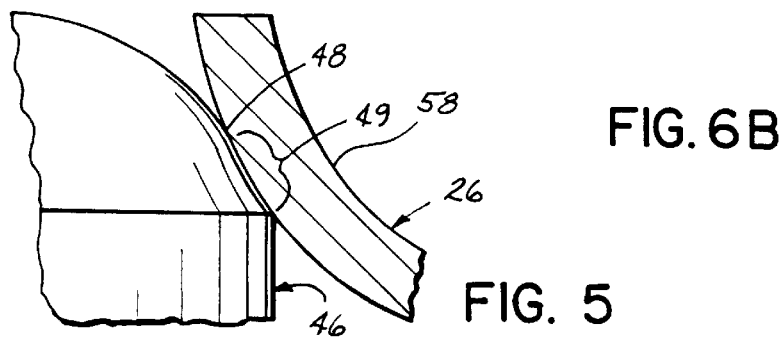
FIG. 5

HUBBED BELT AND DRIVE FOR CONVERSION PRESS

FIELD OF THE INVENTION

This invention relates to a mechanical press for converting shells into can ends, and more particularly to a continuous metal belt and drive system for transporting the shells through such a conversion press.

BACKGROUND OF THE INVENTION

As the demand for foods and beverages packed in easy-open containers has grown, there has arisen a need for machinery capable of rapidly producing easy-open can ends in large numbers. Such easy-open can ends are usually manufactured in a reciprocating mechanical press commonly known as a conversion press. A conversion press converts a thin metal disc or shell into an easy-open can end by sequentially performing a series of work operations on the shell. Such work operations include forming a score line defining a tear panel partially separable from the remainder of the can end, forming an integral rivet, and forming an operating tab and attaching the tab to the rivet. Each of these operations is performed at a separate work station in the conversion press, there being a plurality of such work stations corresponding to the plurality of separate work operations to be performed. The work stations are usually arranged along a straight path through the conversion press, and a shell is transported through the press with the shell being momentarily brought to rest at each work station. The shell emerges from the last work station as a completed easy-open can end.

In a typical conversion press, the shells are transported through the press by a continuous conveyor belt extending from one side of the press to the other and travelling along a path between a pair of press members movable with respect to each other. The belt has a plurality of apertures to carry the shells to each work station from one end of the press to the other between the press members. The press members carry tooling for converting the shells into can ends. The belt is moved stepwise through the conversion press in synchronism with the opening and closing of the press members.

The belt is commonly an endless stainless steel loop and is mounted about a pair of spaced-apart cylindrical drums, at least one of which is rotatably driven in synchronization with the reciprocation of the press. The belt has a plurality of large apertures for carrying the shells, and a plurality of smaller drive holes which are engaged by pins extending outwardly from the surface of the drive drum. The belt is intermittently advanced with the drive drum via the interaction of the pins with the drive holes. A downstacker mechanism at one end of the press and synchronized with the intermittently movable belt supplies shells to the shell-carrying apertures in the belt, and the belt intermittently transports the shells through the press work stations to the other end of the press where the completed can ends are ejected out of the press.

In a conversion press operating at high speed, such as 600 or more strokes per minute, the forces required to accelerate and decelerate the belt are substantial. In existing metal belts, the inner edge of a drive hole lies in the plane of the belt, so that contact between a drive pin and a drive hole occurs only on the inner edge of the hole. The area of contact is thus limited by the material thickness of the belt, which typically is quite thin. Consequently, there are significant contact stresses in the metal belt at the edges of the drive holes as the drive pins engage the drive holes to advance the belt. There is also interference between the pins and the hole inner edges as the pins, which travel on a circular arc path, engage the drive holes traveling on a straight path up to the point of tangency between the belt and the drive drum. Over time, the interference causes the drive pin holes to wear at the locations of interference between the pins and the hole inner edges, and a slight deformation is introduced. This deformation creates two problems. First, the deformation acts as a stress concentrator, and frequently leads to a crack propagating from the deformation point. Second, the fit between the pins and drive holes becomes worse, which reduces the contact area and thus causes the contact stresses on the areas of the drive holes still in contact with the pins to increase, which further aggravates and accelerates the crack propagation problem. Furthermore, the worsening of the fit between the pins and drive holes also results in less accurate indexing of the belt, which is deleterious to the high degree of precision required in a can end conversion press.

When the belt loses tolerance or otherwise fails, the press must be stopped, the belt cut and removed from the press, and a new belt installed and welded to form an endless loop. The time required for such a repair is a significant cost to users of conversion presses, who often desire to operate their presses as much as 24 hours per day.

Therefore, there has been a need for a metal conveyor belt having less susceptibility to drive hole deformation and the resultant loss of tolerance and fatigue cracking at the drive pin holes, and thereby having longer useful life before failure.

SUMMARY OF THE INVENTION

The present invention provides a continuous metal belt system for a conversion press and having a unique drive hole and drive pin configuration which overcomes many of the drawbacks of prior metal belt drive systems noted previously. To this end, and in accordance with the principles of the invention, the drive pin edges are tapered and contoured and the drive holes are hubbed to move the inner edge of each hole up out of the plane of the belt and away from the pin edge. A portion of the lower surface of the belt surrounding each drive hole defines a hub shaped to conform generally to the contoured edge of a drive pin. It is believed that the hubbing of the drive hole greatly reduces or eliminates interference between the pin and the circular inner edge of the hole, and consequently deformation of the drive hole is greatly reduced. The stress concentration problem is also thus reduced, so that the belt can be operated for a longer period of time before it eventually fails. In accordance with a further aspect of the invention, the hub and the contoured pin edge are advantageously mutually shaped to define a rolling contact therebetween as the pin enters and exits the drive hole upon rotation of the drive drum. More specifically, the hub is formed to have a portion which in cross section is a circular arc convex inwardly toward the drive pin, and the contoured pin edge is shaped to have a portion which in cross section is a circular arc concave outwardly toward the hub. The two circular arc portions mesh with each other as the drive pin enters and exits the drive hole. As a result, the contact area between the pin and drive hole is increased relative to an ordinary drive hole in which only the hole inner edge lying in the plane of the belt is contacted by the pin. The mutual shape and resulting rolling contact further reduce stress and deformation and prolong the useful life of the belt.

There is thus provided a metal belt drive system for a conversion press which permits reliable and accurate indexing of the conveyor belt at high press speeds, and improves the useful life of the belt relative to a metal belt having conventional drive holes.

These and other advantages of the present invention shall become more apparent from the accompanying drawings and the description thereof.

BRIEF DESCRIPTION OF THE DRAWINGS

The accompanying drawings, which are incorporated in and constitute a part of this specification, illustrate an embodiment of the invention and, together with the general description of the invention given above, and the detailed description given below, serve to explain the principles of the invention.

FIG. 5 is a still further enlarged cross-sectional view of the tapered and contoured edge of the pin in FIG. 4; and FIGS. 6A through 6D are schematic cross-sectional views similar to FIG. 4, for explaining the interaction between the drive pin and the drive hole as the pin engages the drive hole.

DETAILED DESCRIPTION OF A SPECIFIC EMBODIMENT

Figure 1:
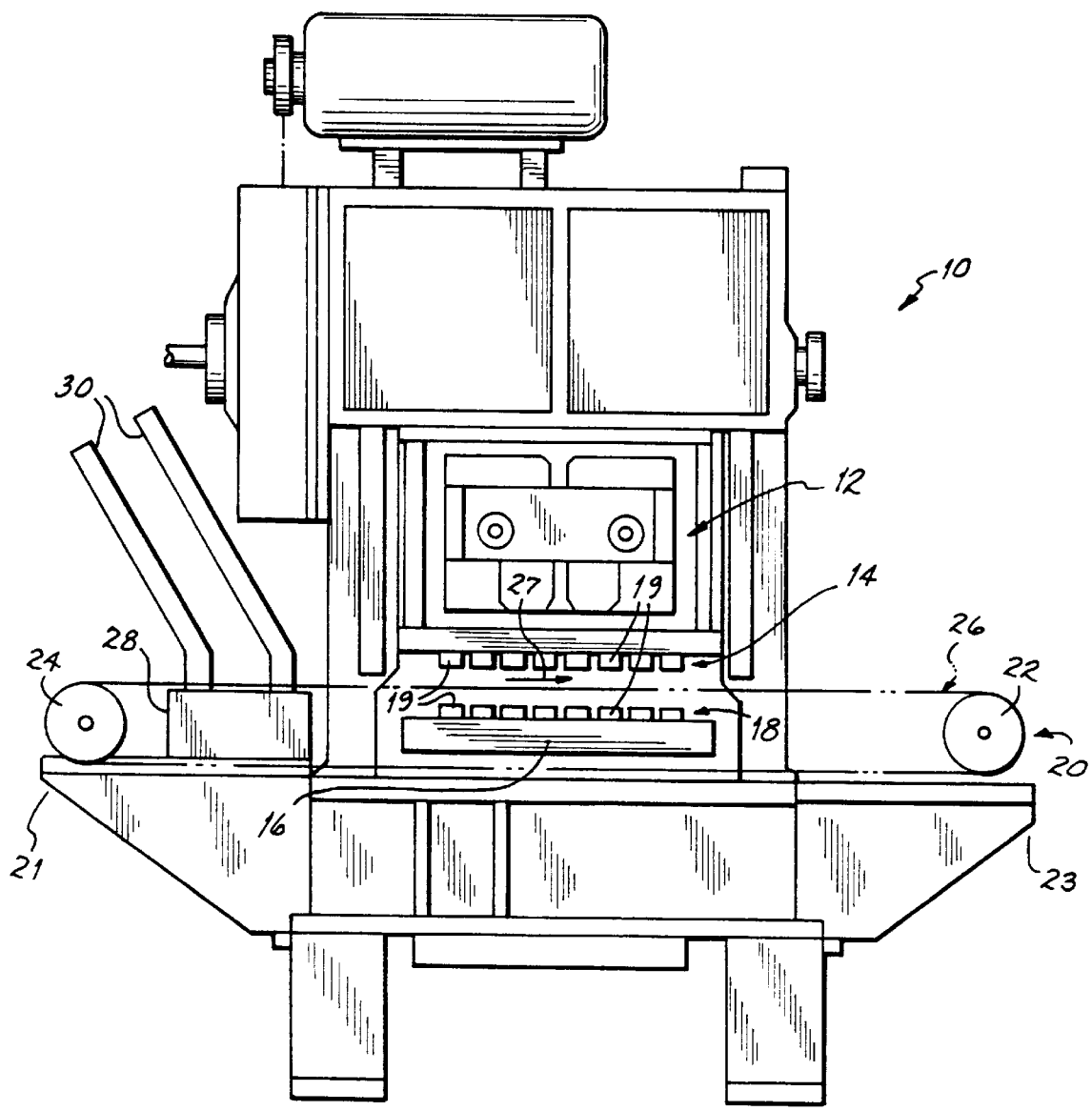
FIG. 1 is a side elevation of a conversion press incorporating a metal belt drive system in accordance with the principles of the present invention.

With reference to FIG. 1, a press 10 incorporating a metal belt drive system 20 according to the present invention is shown. The press 10 includes an upper reciprocating press member 12 on which is mounted a series of upper tooling sets 14, and a lower press member 16 on which is mounted a series of lower tooling sets 18. As is conventional, the upper and lower tooling sets 14 and 18 comprise a series of work stations 19, each work station including an upper tool assembly (not shown) which cooperates with a lower tool assembly (not shown). The work stations are arranged along a straight path running from one end 21 of press 10 to the other end 23 of press 10 (i.e., from left to right in FIG. 1). Advantageously, the press 10 has three identical lanes of work stations arranged side-by-side, so that the press can simultaneously operate upon three shells at a given work station 19. As is well known, the three tooling lanes are staggered relative to each other for reasons which will become apparent.

A plurality of shells S (see FIG. 2) are carried through press 10 by the drive system 20. The drive system 20 includes a pair of cylindrical drums 22 and 24 about which is mounted an endless stainless steel belt 26. In the press 10 shown in FIG. 1, the drum 22 is a drive drum and the drum 24 is an idler or take-up drum. The drive drum 22 is intermittently driven in well-known fashion to be in synchronization with the reciprocation of the press member 12, causing the belt 26 to move intermittently from end 21 to end 23 of press 10 in the direction indicated by arrow 27 in FIG. 1. A downstacker mechanism 28 at end 21 supplies shells S to belt 26 through three chutes 30 (only two shown), and the belt 26 then carries the shells S through the press 10 between tooling sets 14 and 18, briefly stopping each shell S at a given work station 19 to allow the press member 12 to bring the upper tooling 14 into cooperation with the lower tooling 18 to perform an operation upon the shell. After all operations are completed, the can ends formed from the shells S are transferred out of press 10 at end 23.

Figure 2:
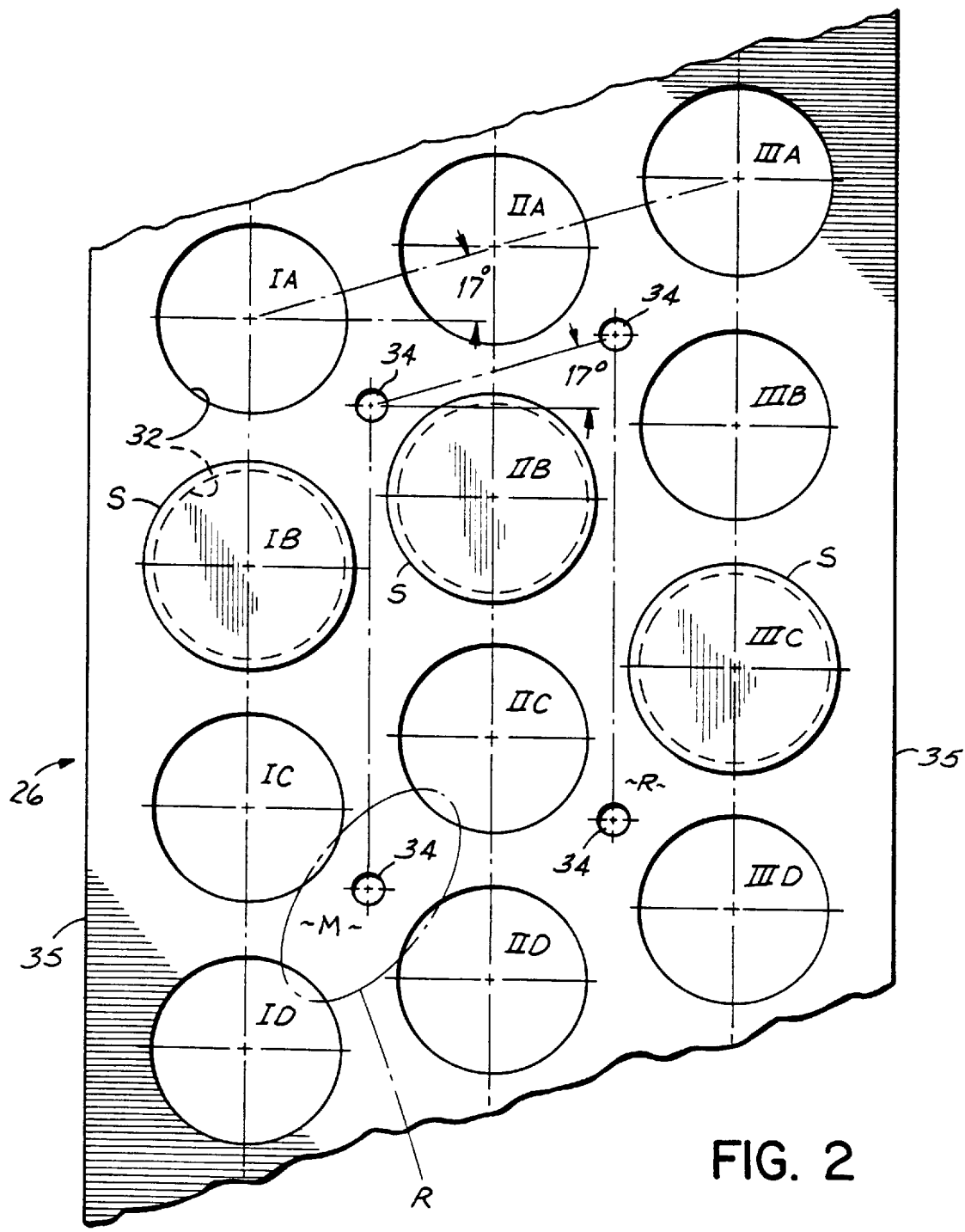
FIG. 2 is a plan view of a section of the metal belt of FIG. 1.

FIG. 2 shows a plan view of a section of belt 26. As can be seen, the belt 26 is a web and includes a plurality of apertures 32 for holding a plurality of shells S (only three shown for sake of clarity, it being understood that each aperture 32 usually carries a shell S) to be transported through the press 10. The apertures 32 are arranged into three parallel lanes extending longitudinally along the belt and denoted as I, II, and III in FIG. 2. The center-to-center spacing of apertures 32 along the lanes is equal to the center-to-center spacing between the progressive work stations 19 in the press 10. Thus, one increment of belt motion moves a shell S from one tooling station 19 to the next in a stepwise fashion. As is well known, the lanes of tooling in the press 10 are staggered relative to each other to facilitate the staking of operating tabs onto integral rivets formed in the can ends within the conversion press. Accordingly, the aperture lanes on the belt 26 are likewise staggered in the same manner.

The belt 26 further has a plurality of drive holes 34 regularly spaced longitudinally along the belt 26. The drive holes 34 are advantageously located between aperture lanes I and II and between lanes II and III in regions R of the belt where a substantial amount of belt material M surrounds each hole 34, as shown in FIG. 2. Thus, the holes 34 are advantageously staggered at the same angle as the aperture lanes I, II, and III. For the belt shown in FIG. 2, the shell-carrying apertures 32 and drive holes 34 are staggered at an angle of approximately 17 degrees from the transverse direction. The belt 26 is approximately 10 inches wide, and the shell-carrying apertures 32 have a diameter of approximately 2.28 inches. The apertures 32 are spaced approximately 3.0 inches apart (on center) in the longitudinal direction, and the drive holes 34 are spaced at twice the spacing of apertures 32, or approximately 6.0 inches apart (on center) in the longitudinal direction. The apertures 32 are spaced approximately 3.1 inches apart (on center) along a line oriented 17 degrees from the transverse direction, with the apertures in lanes I and III having their centers approximately 2.1 inches from the belt edges 35 as measured along the same 17-degree line. Drive holes 34 are spaced apart approximately 3.2 inches (on center) along a line oriented 17 degrees from the transverse direction. The configuration and dimensions of the drive holes 34 are described below in connection with FIG. 4.

Figure 3:
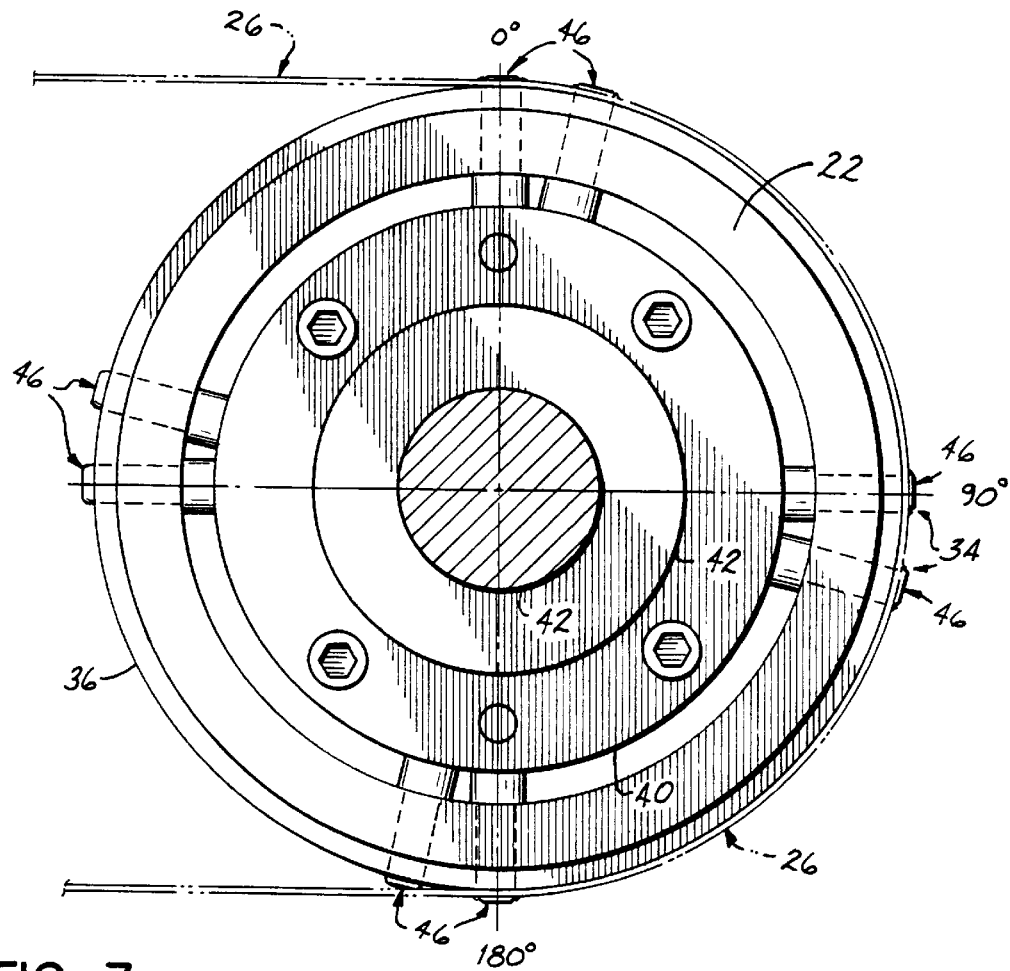
FIG. 3 is a cross-sectional view of the drive drum and metal belt of FIG. 1.

FIG. 3 depicts a cross-sectional view of the drive drum 22 and a portion of the belt 26. The construction of drive drum 22 is substantially described in U.S. Pat. No. 5,158,410, the disclosure of which is incorporated herein by reference. The drive drum 22 includes an outer rim 36 of generally cylindrical configuration which contacts and supports the belt 26, and a hub portion 40 which is connected to a drive shaft 42 via a conventional collet coupling 44. Drive pins 46 are mounted through the drive drum 22 so that the free ends of the drive pins 46 extend outward from the outer rim 36. In accordance with the principles of the present invention, the drive pins 46 are tapered and contoured adjacent their free ends, as explained in greater detail below in connection with FIG. 4. With further reference to FIG. 3, the drive pins 46 are arranged into two circumferential rows spaced approximately 3.0 inches apart (on center) across the face (lengthwise) of the drum 22, the spacing corresponding to the transverse spacing between the drive holes 34. Because the drive holes 34 are staggered on the belt 26, the circumferential rows are likewise angularly staggered with respect to each other, as shown in FIG. 3. In the embodiment of the drive drum 22 shown in FIG. 3, each row of drive pins 46 has four drive pins 46 spaced 90 degrees apart. The diameter of the drive drum 22 is selected such that a 45 degree rotation of the drum 22 advances the belt 26 a linear distance equal to the longitudinal spacing between shell-carrying apertures 32, which is also the spacing between adjacent work stations 19 in the press 10. For instance, the drive drum 22 shown in FIG. 3 has a diameter of approximately 7.7 inches in accordance with the longitudinal aperture spacing of approximately 3.0 inches.

Figure 4:
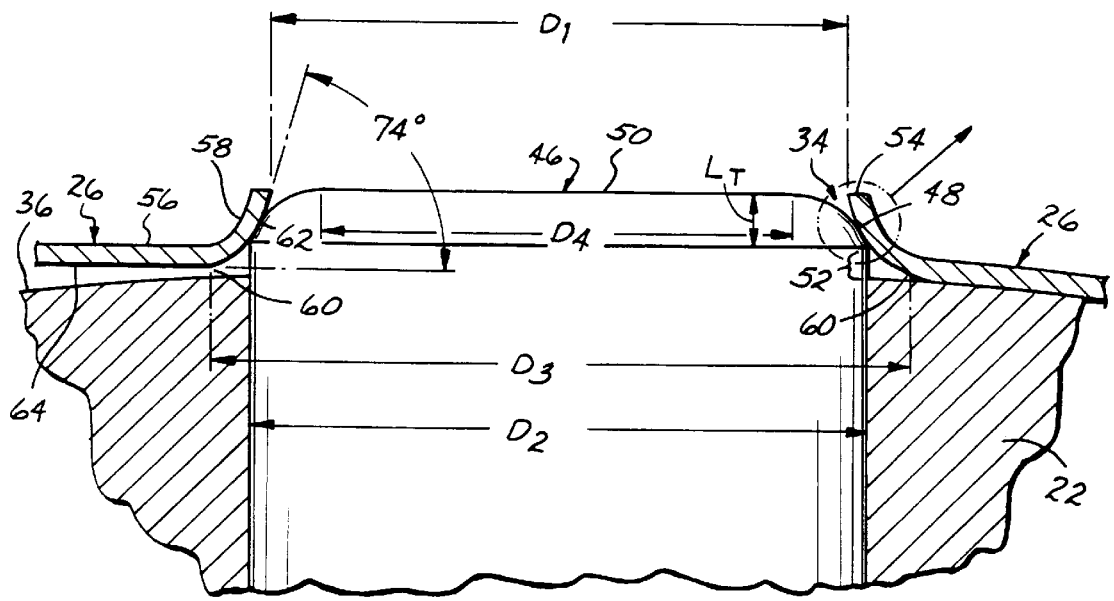
FIG. 4 is a greatly enlarged cross-sectional view of a drive hole and pin of FIG. 3.

FIG. 4 shows a greatly enlarged cross-section of a drive pin 46 and a drive hole 34 in the belt 26. The pin 46 has a tapered and contoured edge 48 extending between the tip 50 and a body 52. The body 52 has a diameter equal to the untapered diameter of the pin 46, and lies above the rim 36 of the drive drum 22. The drive hole 34 is hubbed such that the hole inner edge 54 (which would normally define the sharp inner edge in a conventional belt) is pushed upwardly so as to lie above the upper planar surface 56 of the belt 26 and be directed generally away from the drum 22. The hubbing is accomplished by deforming the metal surrounding the drive hole 34 outwardly to form a hub 58 extending between the hole inner edge 54 and a locus 60 at which the hub 58 smoothly blends into the undeformed material of the belt 26. The inner surface 62 of the hub 58 is an extension of the lower surface 64 of the belt 26. With reference to FIGS. 4 and 5, advantageously, the hub 58 is shaped so that in cross section the inner surface 62 is a circular arc convex inwardly toward the drive pin 46, and the edge 48 of pin 46 is shaped to include a portion 49 which in cross section is a circular arc concave outwardly toward the hub 58. By virtue of the rounded shapes of the hub 58 and the pin edge 48, undesirable interference between the pin 46 and the inner edge 54 of the drive hole 34 is reduced or eliminated. Moreover, the rounded shapes facilitate rolling contact between the hub 58 and pin edge 48, as will be described below in connection with FIGS. 6A–6D.

The drive hole 34 shown in FIG. 4 has a diameter $D_1$ of approximately 0.43 inch measured at the inner edge 54, and the pin 46 has a diameter $D_2$ of approximately 0.46 inch in the untapered region. The hub 58 has a maximum diameter $D_3$ of approximately 0.53 inch measured at the locus 60 where the hub blends into the planar belt 26. The inner edge 54 lies approximately 0.05 inch above the upper surface 56 of belt 26, with belt 26 having a thickness of approximately 0.02 inch and the pin 46 extending approximately 0.07 inch above the rim 36 of the drive drum 22. The hub 58 has a maximum inclination of approximately 74 degrees with respect to the planar surface of the belt 26. Drive pin 46 has a taper diameter $D_4$ of approximately 0.40 inch, and a taper length $L_T$, of approximately 0.05 inch.

A drive hole 34 in accordance with the principles of the present invention is formed in a stainless steel belt 26 by first machining a clean hole through the belt, and then deforming a region of belt material surrounding the hole via cooperating punch and die tooling to produce the desired shape of the hub 58. The design of suitable tooling and selection of manufacturing techniques for accomplishing the formation of a hub 58 in accordance with the principles of the present invention are within the ability of persons of ordinary skill in the mechanical arts.

Figure 6C:
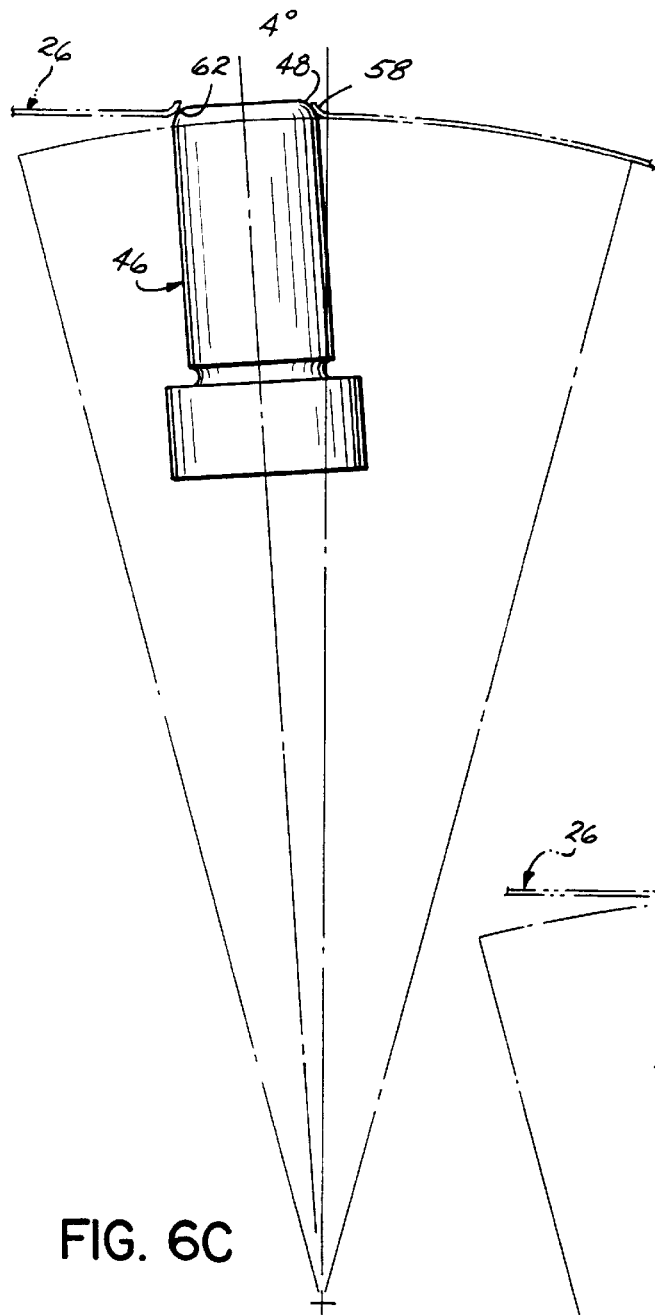
Figure 6D:
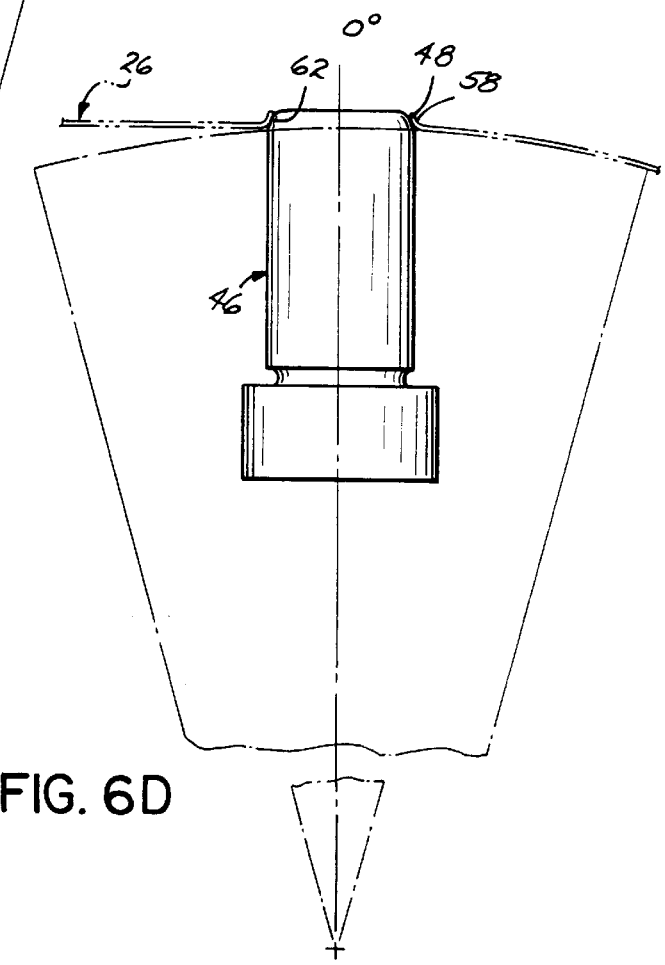

FIGS. 6A through 6D illustrate the interaction between a drive pin 46 and a drive hole 34 as the pin 46 is carried by the drive drum 22 to engage the drive hole 34. In this respect, FIGS. 6A–6D depict a series of schematic views each of which represents a single instant in time during a rotational movement of the drive drum 22. The views are arranged chronologically, and the angular position of the drive pin 46 with respect to a vertical line is indicated on each view. Thus, the earliest moment in time corresponds to FIG. 6A showing the drive pin 46 oriented 12 degrees from vertical, and the latest moment in time corresponds to FIG. 6D showing the drive pin 46 oriented zero degrees from vertical.

The drive pin 46 travels along a circular path in the clockwise direction. The belt 26 becomes tangent to the drive drum 22 at the position denoted as zero degrees shown in FIG. 6D. Prior to that time, the belt 26 is traveling along a straight path defined by the drive and idler drums 22 and 24. Thus, from the 12-degree position of FIG. 6A to the zero-degree position of FIG. 6D, the pin 46 is rotating with respect to the belt 26 and drive hole 34. The pin edge 48 makes initial contact with the inner surface 62 of hub 58 at a position between the 12-degree position shown in FIG. 6A and the 8-degree position shown in FIG. 6B. Note that the pin edge 48 does not contact the sharp inner edge 54 of hole 34. Between the 8-degree position shown in FIG. 6B and the zero-degree position shown in FIG. 6D, the pin edge 48 and hub inner surface 62 make rolling contact. That is, the area of contact moves upward toward the inner edge 54 of the drive hole 34 as the pin edge 48 rolls on the hub inner surface 62. The contact area reaches its uppermost extent at the zero-degree position of FIG. 6D when the pin 46 is fully engaged in the drive hole 34, but even in that position the pin edge 48 still does not contact the hole inner edge 54.

As time progresses beyond that depicted in FIG. 6D, the drive hole 34 and pin 46 remain substantially fixed relative to each other (i.e., there is substantially no relative rotation therebetween) as the drum 22 indexes the belt 26 via 45-degree rotations of the drum 22. As the drive hole 34 and pin 46 reach and move beyond the position denoted as 180 degrees in FIG. 3, the pin 46 exits the drive hole 34 in a manner substantially the reverse of that shown in FIGS. 6A–6D.

In operation, belt 26 is installed in a press by mounting it about drums 22 and 24 with the drive hole hubs 58 directed outwardly and with pins 46 engaging drive holes 34, and then adjusting the spacing between the drums 22 and 24 to impart the desired degree of tension in the belt 26, as is well known. If the press provides for appropriate access to drums 22 and 24, belt 26 may have its ends joined together to form an endless loop prior to the belt 26 being mounted about drums 22 and 24. Otherwise, the ends of the belt 26 are joined together after the belt 26 is wrapped about the drums 22 and 24. Suitable joining techniques, such as butt welding, are well known. After installation of belt 26, operation of the press proceeds in the same manner appropriate for presses using conventional metal belts.

By virtue of the foregoing, there is thus provided a drive system for a conversion press employing unique drive hole and pin configurations which permit a drive pin to engage into and exit out of a drive hole without interference between the pin and the thin inner edge of the hole. Because the hubbed drive hole is less prone to permanent deformation than a conventional drive hole, a close fit between the pin and drive hole is maintained for a longer period of use. Accurate and reliable indexing of the belt is thereby maintained for a longer time.

While the present invention has been illustrated by a description of a particular embodiment and while this embodiment has been described in considerable detail, it is not the intention of the applicant to restrict or in any way limit the scope of the appended claims to such detail.

Additional advantages and modifications will readily appear to persons skilled in the art. For instance, while the described embodiment incorporates a tapered and contoured drive pin, the hubbed belt configuration could be used with a straight or untapered pin and still achieve the advantage of reducing or eliminating contact between the sharp inner edge of a drive hole and a pin. Furthermore, while the described belt has three lanes of shell-carrying apertures, the invention is applicable to belts having any number of lanes and to presses where either or both of the press members is movable. The invention in its broader aspects is therefore not limited to the specific details and illustrative example shown and described. Accordingly, departures may be made from such details without departing from the spirit or scope of applicant's general inventive concept.

What is claimed is:

1. A drive system for transporting can end shells through a conversion press, the drive system comprising:

a continuous metal belt adapted to support a plurality of said shells movable with the belt and having drive holes defined in the belt;

a pair of spaced apart cylindrical drums about which the belt is mounted, at least a first of the drums being rotatably driven so as to move the belt upon rotation of the first drum whereby to transport said shells through said conversion press, the first drum having a drive pin extending above a surface of the drum, the pin having a free end adapted to selectively engage into and exit out of one of the drive holes in the metal belt as the belt moves with the rotating drum; and the metal belt including hubs surrounding each drive hole.

2. The drive system of claim 1 wherein the belt has a generally planar surface and each said hub includes a portion protruding out of the planar surface of the belt.

3. The drive system of claim 1 further comprising a plurality of said pins being angularly spaced apart about a circumference of the first drum such that at least two of the pins are simultaneously engaged in corresponding drive holes in the belt.

4. The drive system of claim 3 wherein the plurality of pins define first and second spaced apart rows such that at least two of the pins in each of the rows are simultaneously engaged in corresponding drive holes in the belt.

5. The drive system of claim 3 wherein the belt has a plurality of parallel lanes each extending longitudinally along the belt, each lane having shell-transporting apertures therein whereby the belt simultaneously moves a plurality of said shells through the conversion press, the drive holes being regularly spaced apart longitudinally along the belt between the lanes.

6. The drive system of claim 1 wherein the drive pin has a tapered and contoured edge adjacent the free end of the pin, and each said hub has an inner surface.

7. The drive system of claim 6 wherein the hub inner surface and the pin edge are mutually shaped to define rolling contact therebetween as the pin engages into and exits out of the drive hole upon rotation of the first drum.

8. The drive system of claim 7 further comprising a plurality of said pins being angularly spaced apart about a circumference of the first drum such that at least two of the pins are simultaneously engaged in corresponding drive holes in the belt.

9. The drive system of claim 1 wherein each said hub has an inner surface which is convex inwardly and the pin has a tapered and contoured edge adjacent the free end of the pin, the pin edge including a portion which is concave outwardly.

10. The drive system of claim 9 further comprising a plurality of said pins being angularly spaced apart about a circumference of the first drum such that at least two of the pins are simultaneously engaged in corresponding drive holes in the belt.

11. A continuous metal belt for transporting shells through a can end conversion press, the belt comprising:

an elongated metal web defining a generally planar surface, the metal web having a plurality of shell-supporting apertures therethrough and a plurality of drive holes therethrough whereby to transport shells through the conversion press by movement of the belt responsive to drive pins engaging into and out of the drive holes; and each drive hole being surrounded by a hub formed integrally with the belt, each said hub protruding out of the belt planar surface.

12. The belt of claim 11 wherein each hub has an inner surface adapted to cooperate with said drive pins.

13. The belt of claim 12 wherein each said hub inner surface is contoured whereby to define rolling contact between said hub inner surface and a contoured edge of said drive pins as a said pin engages into and exits out of the drive hole.

14. The belt of claim 12 wherein each hub inner surface is convex inwardly.

15. A method of making a metal belt for transporting shells through a conversion press, the method comprising:

providing an elongated metal web having a generally planar first surface;

forming a plurality of apertures through said metal web, the apertures being regularly spaced apart longitudinally along said web and adapted to support a plurality of said shells movable with the belt;

forming a drive hole through said metal web away from said apertures, the drive hole having an inner edge; and deforming a region of said metal web adjacent said drive hole to form a hub with the hole inner edge spaced away from the first planar surface of the metal web.

16. The method of claim 15 further comprising forming the hub with an inner surface extending between a second generally planar surface of the belt and the inner edge.

17. The method of claim 15 further comprising forming the hub with a convex inwardly inner surface.

* * * * *